United States Patent [19]

Dowbenko et al.

[11] Patent Number: 4,652,610

[45] Date of Patent: Mar. 24, 1987

[54] COMPOSITIONS BASED ON SILICON-CONTAINING RESINS HAVING HYDROLYZABLE GROUPS

[75] Inventors: Rostyslaw Dowbenko, Gibsonia; Debra L. Singer, Pittsburgh; William P. Blackburn, Evans City; Frank C. Williams, Jr., Sarver, all of Pa.

[73] Assignee: PPG Industries, Inc., Pittsburgh, Pa.

[21] Appl. No.: 816,080

[22] Filed: Jan. 3, 1986

[51] Int. Cl.$^4$ .................................................. C08F 8/00
[52] U.S. Cl. ..................................... 525/100; 525/403; 525/431; 525/446; 525/453
[58] Field of Search ................. 525/446, 453, 403, 431, 525/100

[56] References Cited

U.S. PATENT DOCUMENTS

| | | | |
|---|---|---|---|
| 2,563,516 | 8/1949 | Burkhard | 556/427 |
| 2,835,690 | 5/1958 | Prober | 528/32 |
| 3,170,940 | 2/1965 | Johnston | 528/30 |
| 3,627,806 | 12/1971 | LeGrow | 260/448.2 |
| 3,635,887 | 1/1972 | Polmanteer | 528/41 |
| 3,652,733 | 3/1972 | Davenport | 117/132 |
| 3,884,860 | 5/1975 | Brown | 556/427 |
| 3,919,438 | 11/1975 | Urkevich | 427/54 |

Primary Examiner—Melvyn I. Marquis
Attorney, Agent, or Firm—Thomas M. Breininger

[57] ABSTRACT

Disclosed is a curable composition containing (A) a first silicon-containing resin containing at least one molecule having in a terminal and/or side chain thereof at least one silicon atom bonded to a group Y, wherein Y represents a hydrolyzable group; and (B) a second silicon-containing resin, different from the first silicon-containing resin. The second silicon-containing resin contains at least one molecule having in a terminal and/or side chain thereof at least one group corresponding to the following formula

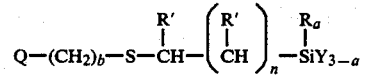

wherein Q is the residue of a substance such as a polyester resin, an acrylic resin, a urethane resin, a polyamide resin, and a polyether resin, each Y represents a hydrolyzable group, each R represents a $C_1$–$C_4$ alkyl group, a vinyl group or an allyl group, each R' represents H or a $C_1$–$C_4$ alkyl group, a is an integer of from 0 to 2, b is an integer of from 0 to 6, and n is an integer of from 1 to 2.

In preferred compositions, the second silicon-containing resin serves as a flexibilizer for the composition.

27 Claims, No Drawings

COMPOSITIONS BASED ON SILICON-CONTAINING RESINS HAVING HYDROLYZABLE GROUPS

BACKGROUND OF THE INVENTION

There is a continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing.

However, previous approaches to meet these challenges generally have involved disadvantageous compromises among desirable coating composition properties such as molecular weight of the principal film forming resin, application viscosity of the composition, low curing temperature, and desirable properties of the cured film such as water resistance, flexibility, hardness, solvent resistance, etc.

One approach to address some of these challenges has been to employ curable compositions based on silyl-group-containing vinyl resins which have a main chain consisting essentially of vinyl polymer and having at least one silicon atom connected to a hydrolyzable group on a terminal or side chain. Such silyl-group-containing vinyl resins are described, for example, in U.S. Pat. No. 4,339,261. Two methods are disclosed for preparing the silyl-group-containing vinyl resins of the patent.

The first involves the reaction of a hydrosilane with a vinyl resin having carbon-carbon double bonds in the presence of a complex of a Group VIII transition metal. The preparation of such silyl group containing resins by this first method is also described in U.S. Pat. No. 4,191,713. The second method described in U.S. Pat. No. 4,399,261 for preparing the silyl group containing vinyl resin involves free radical copolymerization of a vinyl compound with a silane compound of specified formula having a polymerizable double bond therein, an example of the silane compound being gamma-methacryloxypropyltrimethoxysilane.

However, coating compositions based, for example, on such prior art resins exhibit a number of disadvantages. For example coating compositions based on such resins tend to cure to films which are ultimately too brittle or too inflexible for high performance coatings uses such as, for example, in automotive applications. Moreover, compositions based on such resins often do not cure as well as is desirable for a number of purposes, and typically contain lower total solids contents than is desirable for a number of purposes.

Objects of the present invention are to help meet these challenges based on a new class of compositions which is a subject of the present disclosure. Other objects of the invention will become apparent to the reader infra.

SUMMARY OF THE INVENTION

The present invention is for a a curable composition containing (A) a first silicon-containing resin containing at least one molecule having in a terminal and/or side chain thereof at least one silicon atom bonded to a group Y, wherein Y represents a hydrolyzable group; and (B) a second silicon-containing resin, different from the first silicon-containing resin, the second silicon-containing resin containing at least one molecule having in a terminal and/or side chain thereof at least one group corresponding to the following formula (I)

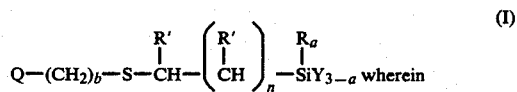

Q is the residue of a substance selected from the group consisting of a polyester resin, an acrylic resin, a urethane resin, a polyamide resin, and a polyether resin, each Y, which may be the same or different, represents a hydrolyzable group, each R, which may be the same or different, represents a $C_1$–$C_4$ alkyl group, a vinyl group or an allyl group, each R', which may be the same or different, represents H or a $C_1$–$C_4$ alkyl group, a represents an integer of from 0 to 2, b represents an integer of from 0 to 6, and n represents an integer of from 1 to 2.

The present invention also is for a composition of the invention additionally comprising an organic polyol and/or a reactive silicon-containing constituent different from the first and second silicon-containing resins, which silicon-containing constituent contains a hydrolyzable group bonded to silicon.

In a preferred embodiment of the invention the first silicon-containing resin has a glass transition temperature of greater than 25 degrees C. and the second silicon-containing resin serves as a flexibilizer for the first silicon-containing resin. Preferred compositions of the invention provide cured films having a good combination of hardness and flexibility.

DETAILED DESCRIPTION OF THE INVENTION

A composition of the present invention is curable and contains (A) a first silicon-containing resin containing at least one molecule having in a terminal and/or side chain thereof at least one silicon atom bonded to a group Y, wherein Y represents a hydrolyzable group; and (B) a second silicon-containing resin, different from the first silicon-containing resin, the second silicon-containing resin containing at least one molecule having in a terminal and/or side chain thereof at least one group corresponding to the following formula (I)

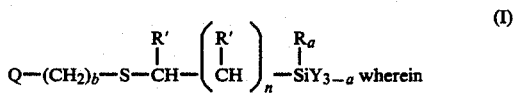

Q is the residue of a substance selected from the group consisting of a polyester resin, an acrylic resin, a urethane resin, a polyamide resin, and a polyether resin, each Y, which may be the same or different, represents a hydrolyzable group, each R, which may be the same or different, represents a $C_1$–$C_4$ alkyl group, a vinyl group or an allyl group, preferably a $C_1$–$C_4$ alkyl group, and more preferably methyl, each R', which may be the same or different, represents H or a $C_1$–$C_4$ alkyl group, preferably H, a represents an integer of from 0 to 2, preferably an integer of from 0 to 1, and most preferably 0, b represents an integer of from 0 to 6, preferably an integer of from 0 to 3, and n represents an integer of from 1 to 2, preferably 1.

Examples of groups suitable as the hydrolyzable group Y include: —OR$^1$,

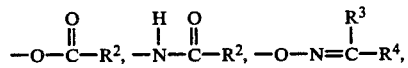

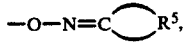

and the monohydroxy and/or cyclic $C_2$-$C_3$ residue of a 1,2- or 1,3-glycol, wherein R represents $C_1$-$C_4$ alkyl, R$^2$ independently represents H or $C_1$-$C_4$ alkyl, R$^3$ and R$^4$ independently represent H, $C_1$-$C_4$ alkyl, $C_6$-$C_8$ aryl R$^5$ represents $C_4$-$C_7$ alkylene.

Preferred hydrolyzable groups include $C_1$-$C_4$ alkoxy groups, and more preferred hydrolyzable groups include methoxy groups.

The first and second silicon-containing resins typically are ungelled. However, compositions based on first and second silicon-containing resins in the form of, for example, dispersion polymers, emulsion polymers, or even solids are considered to be within the scope of the present invention.

Vinyl-type silane monomers generally are utilized to provide the structure

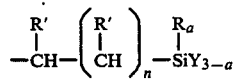

in formula (I) above for the second silicon-containing resin. Examples of such vinyl-type monomers include: vinylalkoxysilanes such as vinyltrimethoxysilane, methylvinyltrimethoxysilane, vinyltriethoxysilane, methylvinyltriethoxysilane, vinylmethyldimethoxysilane, vinylethyldiethoxysilane, and vinyltris(2-methoxyethoxy)silane; vinylacetoxysilanes, such as vinylmethyldiacetoxysilane, vinylethyldiacetoxysilane and vinyltriacetoxysilane; allylalkoxysilanes such as allyltrimethoxysilane, allylmethyldimethoxysilane, and allyltriethoxysilane; divinylalkoxysilanes and divinylacetoxysilanes such as divinyldimethoxysilane, divinyldiethoxysilane and divinyldiacetoxysilane; diallylalkoxysilanes and diallylacetoxysilanes such as diallyldimethoxysilane, diallyldiethoxysilane and diallyldiacetoxysilane; as well as other similar ethylenically unsaturated silane monomers containing one or more hydrolyzable groups. As will be appreciated by one skilled in the art given the present disclosure, use of compounds such as divinyl-group-containing silanes (e.g., divinyldimethoxysilane) and diallyl-group-containing silanes (e.g., diallyldimethoxysilane) can provide structures

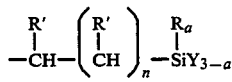

in formula (I) above in which, for example, the group R can be a vinyl group (e.g., —CH=CH$_2$) or an allyl group (e.g., —CH$_2$—CH=CH$_2$). In such an instance, the Si atom will be bonded to either one or two hydrolyzable groups. It is also possible that more complex structures can be formed, for example, by reaction of both vinyl-type groups on, for example, a divinyl-group-containing silane monomer with mercapto groups on different mercapto-group-containing compounds.

Of the vinyl-type silane monomers described above, the monovinyl-type silane monomers (e.g., vinyltrimethoxysilane or vinylmethyldimethoxysilane as contrasted with divinyl-type silane monomers) are preferred. More preferred vinyl-type silane monomers include vinyl alkoxy silanes especially those having 1 to 4 carbon atoms in the alkoxy group. Particularly preferred vinyl alkoxy silanes are vinyl trialkoxy silanes selected from the group consisting of vinyl trimethoxy silane, vinyl triethoxy silane and a mixture thereof.

The aforesaid second silicon-containing resins can be prepared in a number of ways.

A first way to prepare the second silicon-containing resins for compositions of the invention is to react (A) a mercapto-functional resin with (B) a vinyl-type silane monomer such as those described above, in the presence of a free radical initiator. Examples of mercapto-functional resins include mercapto-functional polyesters, mercapto-functional acrylics, mercapto-functional urethanes, mercapto-functional polyethers and mercapto-functional amide-containing resins. Of the above mercapto-functional resins for this first way to prepare the second silicon-containing resins, mercapto-functional polyesters and mercapto-functional acrylics are preferred, mercapto-functional polyesters being most preferred.

Mercapto groups can be introduced into polyesters, acrylics, urethanes, polyethers, amide-containing resins, etc., for example, by reacting carboxyl functionality of mercapto-functional carboxylic acids with hydroxyl groups on the aforesaid resins which have been prepared by generally known means to contain such hydroxyl groups. Examples of suitable mercapto-functional carboxylic acids include mercapto propionic acid (i.e., HS—CH$_2$CH$_2$—COOH) and thioglycolic acid i.e., HS—CH$_2$—COOH).

As stated previously, in the first way to prepare the second silicon-containing resin for a composition of the invention, the mercapto-functional resin is reacted with the vinyl-type silane monomer in the presence of a free radical initiator. Where desired, free radicals may be generated by the action of ultraviolet light or ionizing particle radiation such as electron beam radiation, on resins containing, for example, suitable ethylenic unsaturation which can generate free radicals upon application of ultraviolet light or ionizing radiation. Typically, however, a free radical initiator is utilized in the preparation of the second silicon-containing resin. Examples of suitable free radical initiators include: azo compounds such as, for example, alpha alpha'-azobis(isobutyronitrile) and 2,2'-azobis(2,4-dimethylvaleronitrile) (available as VAZO 67); peroxides such as benzoyl peroxide and cumene hydroperoxide; and tertiary butyl peracetate, isopropyl percarbonate, butyl isopropyl peroxy carbonate and similar compounds. The amount of free radical initiator used generally ranges from 0.1 mole to 1 mole of initiator per mole of mercapto functionality or vinyl unsaturation.

Typically the addition reaction of the vinyl-type silane monomer with the mercapto-functional resin is carried out in an organic solvent medium. Organic solvents which may be utilized include virtually any of the organic solvents heretofore employed for vinyl addition reactions such as involved in the solution polymerization of more conventional vinyl-type monomers such as acrylic monomers. Examples of such organic solvents include alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

In the aforesaid first way for preparing the second silicon-containing resin, the hydroxyl-functional resin typically is first reacted with the mercapto-functional carboxylic acid to form the mercapto-functional ester. Thereafter, the resulting mercapto-functional ester is reacted with the vinyl-type silane monomer such as a vinyl alkoxy silane monomer in the presence of the free radical initiator to form the resin containing at least one molecule having in a terminal and/or side chain at least one group corresponding to the formula (1) above. It is believed that the high yield of resin corresponding to formula (I) which results is attributable at least in part to the fact that the vinyl-type silane monomer, such as the vinyl alkoxy silane monomer, does not tend to homopolymerize in the preparation of the second silicon-containing resin. Rather it adds essentially 1 to 1 with the HS-group of the mercapto-functional resin in the presence of the free radical initiator.

When the second silicon-containing resin is prepared by reacting a hydroxyl-functional resin with a mercapto-functional carboxylic acid and thereafter with the vinyl-type silane monomer in the presence of free radical initiator, the average hydroxyl-functionality of the starting hydroxyl-functional resin may vary widely. However, typically the average hydroxyl-functionality of the hydroxyl-functional resin is greater than or equal to 1, usually greater than or equal to 1.5, and often greater than or equal to 1.9. Often the hydroxyl-functional resin and mercapto-functional carboxylic acid are chosen to provide a ratio of about 1.0 equivalent of OH to about 1.0 equivalent of COOH. However, it may be desirable for some purposes to choose the respective amounts of hydroxyl-functional resin and mercapto-functional carboxylic acid to provide hydroxyl-functionality in the product resin (i.e., after reaction with the vinyl-type silane monomer) to provide crosslinking sites based on the reaction of the residual hydroxyl groups with, for example, hydrolyzable silyl groups (i.e., ≡Si-Y) on other molecules of product resin or on organosilicon-containing materials containing organosilicate compounds or organosilane compounds as described hereinbelow.

For some purposes it is desirable that the second silicon-containing resins be essentially free of detectable mercapto functionality.

A second way to prepare the second silicon-containing resins is to react (A) an adduct of a mercapto-functional alcohol and a vinyl-type silane monomer (such as a vinyl alkoxy silane monomer), (B) an organic polyisocyanate, and (C) a polyol. The resulting product is a urethane, having in a terminal and/or side chain thereof, a silicon atom directly bonded to at least one hydrolyzable group.

Examples of suitable mercapto-functional alcohols include mercapto-functional monohydric alcohols and mercapto-functional polyhydric alcohols such as mercapto ethanol, mercapto propanol, 3-mercapto-2-butanol, thioglycerine, and the like. The mercapto group of the mercapto-functional alcohol and the ethylenically unsaturated group of the vinyl-type silane are reacted in the presence of a free radical initiator. Suitable free radical initiators include those described previously in the discussion of the reaction of mercapto-functional resins with vinyl-type silane monomers Also as discussed above, free radicals may be generated by the action of ultraviolet light or ionizing particle radiation such as electron beam radiation.

The organic polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the organic polyisocyanate. Moreover, isocyanate prepolymers may be utilized as the polyisocyanate. Isocyanate prepolymers refer to the reaction products of a polyol and polyisocyanate in which the polyol and polyisocyanate are reacted, by the generally known prepolymer technique, in relative proportions to produce an isocyanato-functional product, namely the isocyanate prepolymer. Also, mixtures of organic isocyanate prepolymers with monomeric isocyanates (so-called semi-prepolymers) may be utilized in the prepolymer technique.

Examples of polyols useful in the preparation of the second silicon-containing resins include: organic polyols in the broad classes including: (a) simple diols, triols, and higher hydric alcohols; (b) polyester polyols; (c) polyether polyols; (d) amide-containing polyols; (e) acrylic polyols; (f) epoxy polyols; (g) polyhydric polyvinyl alcohols; and (h) urethane polyols.

(a) The simple diols, triols, and higher hydric alcohols are generally known, examples of which include: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3- hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-565 from DOW Chemical Company; and the like.

(b) Polyester polyols are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol suitable for reaction with organosilicon-containing material is one prepared by reacting an alkylene oxide such as ethylene oxide, propylene oxide, butylglycidyl ether, and the glycidyl esters of organic acids such as CARDURA-E, with the carboxylic acid to form the corresponding ester.

Examples of the optional monohydric alcohols which may be used to prepare the polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Alkyd polyols typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd polyols are well known generally. Usually, the process involves reacting together the polycarboxylic acid and fatty acid or partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing polyester polyols. Examples of suitable fatty acids include saturated and unsaturated acids such as stearic acid, oleic acid, ricinoleic acid, palmitic acid, linoleic acid, linolenic acid, licanic acid, eleostearic acid, clupanodonic acid and mixtures thereof. The fatty acids may be in the form of the free acids with sufficient excess of the polyhydric alcohol being incorporated into the esterification mixture to compensate for their inclusion. However, in many instances, glyceride oils may be employed which have been partially alcoholized with sufficient amount of a polyhydric alcohol such as glycerol to supply the requisite amount of available hydroxyls for formation of the alkyd polyol.

(c) Polyether polyols are generally known. Examples of polyether polyols include the poly-(oxyethylene) glycols and poly-(oxypropylene) glycols prepared by the acid or base catalyzed addition of ethylene oxide or propylene oxide to initiators such as ethylene glycol, propylene glycol, diethylene glycol and dipropylene glycol and by the copolymerization of ethylene oxide and propylene oxide with initiator compounds such as trimethylolpropane, glycerol, pentaerythritol, sorbitol, sucrose and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

(d) Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

(e) Acrylic polyols include but are not limited to the known hydroxyl-functional addition polymers and co-polymers of acrylic and methacrylic acids and their ester derivatives including but not limited to their hydroxyl-functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

(f) Epoxy polyols are generally known and can be prepared, for example, by the reaction of glycidyl ethers of polyphenols such as the diglycidyl ether of 2,2-bis (4-hydroxyphenyl) propane, with polyphenols such as 2,2-bis (4-hydroxyphenyl) propane. Epoxy polyols of varying molecular weights and average hydroxyl functionality can be prepared depending upon the ratio of starting materials used.

(g) Polyhydric polyvinyl alcohols are generally known and can be prepared, for example, by the addition polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

(h) Urethane polyols are generally known and can be prepared, for example, by reaction of an organic polyisocyanate with a polyol. Examples of polyisocyanates useful in the preparation of urethane polyols include those described above as exemplary of component (B) in the discussion of a preparation of resins of the invention by reaction of (A) an adduct of a mercapto-functional alcohol and a vinyl-type silane monomer (such as a vinyl alkoxy silane monomer), (B) an organic polyisocyanate, and (C) a polyol. Examples of polyols useful in the preparation of urethane polyols include those described in subsections (a) through (g) above.

Of the polyols described above for preparation of the second silicon-containing resins, polyhydroxyl-functional esters and acrylic polyols are preferred, polyhydroxyl-functional esters being more Preferred. The term "polyhydroxyl-functional esters" is intended to include both oligomeric ester polyols such as 2,2-dimethyl-3-hydroxypropyl-2,2-dimethyl-3-hydroxypropionate and polyester polyols described above.

The molecular weight of suitable organic polyols for preparation of resin compositions containing the second silicon-containing resin can vary within wide limits depending on the nature of the specific classes of polyols as described above chosen for preparation of the resins. The hydroxyl equivalent weight of organic Polyols suitable for preparation of the second silicon-containing resins can vary widely. For some purposes, for example in high solids applications, it is desirable to utilize organic polyols having a hydroxyl equivalent weight of less than or equal to 3,000, and sometimes even less than or equal to 1,000.

In the second way for preparing the second silicon-containing resin, the mercapto-functional alcohol and the vinyl-type silane typically are reacted, in the presence of the free radical initiator, to form the aforesaid adduct, in a separate step from reaction of the adduct with the organic polyisocyanate and the polyol. For example the adduct of the mercapto-functional alcohol and the vinyl-type silane, once prepared, can be reacted first with the organic polyisocyanate to form an isocyanato-functional material. Thereafter, the isocyanato-functional material can be reacted with the polyol. Of course, it will be appreciated, given the disclosure herein, that the order of reacting the components can be varied.

The molecular weight of the second silicon-containing resins may vary widely. However, generally the resins have a number average molecular weight, as determined by gel permeation chromatography using a polystyrene standard, in the range of from about 100 to about 20,000, preferably from about 100 to about 10,000, and more preferably from about 200 to about 5,000.

As stated above, a curable composition of the invention also comprises a first silicon-containing resin containing at least one molecule having in a terminal and/or side chain thereof at least one silicon atom bonded to a group Y, wherein Y represents a hydrolyzable group. Examples of hydrolyzable groups (i.e., Y) for the first silicon-containing resin include those discussed previously in the description of the second silicon-containing resins.

A variety of resins can be employed as the first silicon-containing resin in a composition of the invention. However, typically the first silicon-containing resin is a silane addition interpolymer (vinyl type) containing alkoxy silane moieties and/or acyloxy silane moieties typically, but not necessarily, prepared by reaction of a mixture of monomers containing (i) one or more, typically at least two, ethylenically unsaturated monomers which do not contain silicon atoms, hereinafter referred to for convenience as ethylenically unsaturated silicon-free monomers, preferably comprising an isobornyl group-containing monomer such as isobornyl (meth)acrylate, and (ii) a copolymerizable ethylenically unsaturated alkoxy silane monomer and/or a copolymerizable ethylenically unsaturated acyloxy silane monomer. The molecular weight of useful silane addition interpolymers can vary widely. It is preferred that the silane addition interpolymer have a peak molecular weight, as determined by gel permeation chromatography, of from about 2,000 to about 20,000, preferably from about 2,000 to about 15,000, and most preferably from about 2,000 to about 10,000. It is also preferred that the silane addition interpolymer have a glass transition temperature (Tg) of greater than 25 degrees C. When an isobornyl group-containing monomer is utilized in the preparation of the silane addition interpolymer, the amount of the isobornyl group-containing monomer typically ranges from 10 to 60 percent by weight based on the total weight of the mixture of copolymerizable ethylenically unsaturated monomers.

A silane addition interpolymer may be prepared by various methods. For example, the addition interpolymer may be prepared by hydrosilylation of an addition interpolymer containing carbon-carbon double bonds with a hydrosilane examples of which hydrosilanes include halogenated silanes such as methyldichlorosilane, trichlorosilane, and phenyl dichlorosilane; alkoxysilanes such as methyldiethoxysilane, methyldimethoxysilane, phenyldimethoxysilane, trimethoxysilane, and triethoxysilane; acyloxy silanes such as methyldiacetoxysilane, phenyldiacetoxysilane, and triacetoxysilane; ketoxymate silanes such as bis(dimethylcyclohexylketoxymate)methylsilane, and bis(cyclohexylketoxymate)methylsilane; alkenyloxysilanes such as methyldiisopropenoxysilane, and triisopropenoxysilane; and other silanes such as methyldiaminoxysilane, triaminoxysilane, methyldiaminosilane and triaminosilane. The carbon-carbon double bonds can be incorporated into the addition interpolymer by employing compounds such as allyl compounds examples of which include allyl acrylate and allyl methacrylate. The reaction of the hydrosilane with the addition interpolymer containing carbon-carbon double bonds usually employs a catalyst of a transition metal complex, examples of which transition metals include platinum, rhodium, cobalt, palladium and nickel. Reference can be made to U.S. Pat. Nos. 4,191,713 and 4,399,261 regarding process conditions for carrying out hydrosilylation reactions.

Silane addition interpolymers which are preferred for compositions of the present invention are formed from at least two components, i.e., one or more ethylenically unsaturated silicon-free monomers and an ethylenically unsaturated compound selected from an alkoxysilane monomer, an acyloxysilane monomer or a mixture thereof. The term "ethylenically unsaturated" is employed in a broad sense and is intended to encompass, for example, vinyl compounds, acrylic compounds and methacrylic compounds. The basic criteria with respect to the ethylenically unsaturated monomer are that it contains at least one ethylenic carbon to carbon double bond, that it is copolymerizable without gelation with the the silane monomer component, and that it does not otherwise preclude the utilization of the finished interpolymer.

Examples of suitable ethylenically unsaturated silicon-free monomers for preparing the preferred silane addition interpolymers include: isobornyl (meth)acrylate, the alkyl acrylates, such as methyl acrylate, ethyl acrylate, butyl acrylate, propyl acrylate, and 2-ethylhexyl acrylate; the alkyl methacrylates, such as methyl methacrylate, butyl methacrylate, 2-ethylhexyl methacrylate, decyl methacrylate, and lauryl methacrylate; and unsaturated nitriles, such as acrylonitrile, methacrylonitrile and ethacrylonitrile. Still other ethylenically unsaturated monomers which can be used include: vinyl aromatic hydrocarbons such as styrene, alpha methyl styrene, and vinyl toluene; vinyl acetate; vinyl chloride; and epoxy functional monomers such as glycidyl methacrylate.

The preferred silane addition interpolymer is formed from about 50 percent to about 95 percent, preferably from about 70 percent to about 90 percent by weight of the ethylenically unsaturated silicon-free monomers and from about 5 percent to about 50 percent, preferably from about 10 percent to about 30 percent by weight of the copolymerizable ethylenically unsaturated silane monomer, based on the total weight of all monomers utilized for preparing the interpolymer. The amount of isobornyl (meth)acrylate when employed for preparing the addition interpolymer typically can range from 10 percent to 60 percent, usually from 40 to 20 percent, by weight based on the total weight of all monomers utilized for preparing the interpolymer and thus includes, for example, the total weight of (i) the ethylenically unsaturated monomers which do not contain silicon atoms, i.e., the ethylenically unsaturated silicon-free monomers, and (ii) the copolymerizable ethylenically unsaturated alkoxy silane monomer and/or the copolymerizable ethylenically unsaturated acyloxy silane monomer.

The other component of the preferred silane addition interpolymer is an organosilane compound, which usually is an ethylenically unsaturated alkoxysilane, an ethylenically unsaturated acyloxysilane or a mixture thereof. Alkoxysilanes which can suitably be employed and are preferred are the acrylatoalkoxysilanes, such as gamma-acryloxypropyltrimethoxysilane and gamma-acryloxypropyldimethoxymethylsilane, as well as the methacrylatoalkoxysilanes, such as gamma-methacryloxypropyltrimethoxysilane, gamma-methacryloxypropyltriethoxysilane, gamma-methacryloxypropyldimethoxymethylsilane and gamma-methacryloxypropyltris(2-methoxyethoxy)silane. Examples of other alkoxysilanes which may be employed include the vinylalkoxysilanes, described previously herein, such as vinyltrimethoxysilane, vinyltriethoxysilane and vinyltris(2-methoxyethoxy)silane. Examples of ethylenically unsaturated acyloxysilanes which may be employed include acrylato-, methacrylato- and vinylacetoxysilanes, such as vinylmethyldiacetoxysilane, acrylatopropyltriacetoxysilane, and methacrylatopropyltriacetoxysilane. The interpolymer typically is formed from about 10 percent to about 30 percent by weight of the above described ethylenically unsaturated silane monomer based on the total weight of all monomers utilized for preparing the preferred silane addition interpolymer.

The preferred silane addition interpolymer is formed by interpolymerizing the ethylenically unsaturated silicon-free monomers with the ethylenically unsaturated silane monomers in the presence of a vinyl polymerization initiator. The preferred initiators are azo compounds such as, for example, alpha alpha'-azobis(isobutyronitrile); peroxides such as benzoyl peroxide and cumene hydroperoxide; and tertiary butyl peracetate, isopropyl percarbonate, butyl isopropyl peroxy carbonate and similar compounds. The quantity of initiator employed can be varied considerably; however, in most instances, it is desirable to utilize from about 0.1 to about 10 percent based on the weight of monomer solids. A chain modifying agent or chain transfer agent is ordinarily added to the polymerization mixture. The mercaptans, such as dodecyl mercaptan, tertiary dodecyl mercaptan, octyl mercaptan, hexyl mercaptan and mercaptoalkyl trialkoxysilanes, e.g., 3-mercaptopropyltrimethoxysilane, may be used for this purpose as well as other chain transfer agents such as cyclopentadiene, allyl acetate, allyl carbamate, and mercaptoethanol.

The polymerization reaction for preparation of the silane addition interpolymer typically is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative organic solvents of the above type have been described Previously herein.

Choice of the specific ethylenically unsaturated silicon-free monomers and ethylenically unsaturated silane monomers typically is made such that the addition interpolymer has a glass transition temperature (Tg) of greater than 25 degrees C., preferably from about 30 degrees C. to about 120 degrees C. Where desired, the Tg can be calculated using a generally known equation as found, for example, in "Fundamentals Of Acrylics" by W. H. Brendley, Jr., *Paint And Varnish Production*, Vol. 63 No. 7, July 1973, pages 19–27. In the calculation, values of 110 degrees C. and 125 degrees C. are believed to be suitable for the glass transition temperatures of homopolymers of gamma-methacryloxypropyl trimethoxy silane and isobornyl methacrylate respectively.

A composition of the invention additionally can comprise an organic polyol, and/or a reactive silicon-containing constituent different from the first and second silicon-containing resins, which silicon-containing constituent contains a hydrolyzable group bonded to silicon. Both the first and second silicon-containing resins typically can be cocured with the organic polyol and/or the reactive silicon-containing constituent.

Illustrative of such organic polyols are the organic polyols generally known for use in coating compositions, examples of which polyols include but are not limited to the organic polyols previously described herein with respect to the broad classes including: (a) simple diols, triols, and higher hydric alcohols; (b) polyester polyols; (c) polyether polyols; (d) amide-containing polyols; (e) acrylic polyols; (f) epoxy polyols; (g) polyhydric polyvinyl alcohols; and (h) urethane polyols.

Representative examples of such reactive silicon-containing constituents include a wide variety of materials. The disclosure in the following sections (a) through (e) should be considered to be illustrative of such reactive silicon-containing constituents.

(a) Illustrative examples of the reactive silicon-containing constituent for a composition of the invention include such simple compounds as an amine having in a molecule thereof at least one silicon atom directly bonded to a group Y wherein Y represents a hydrolyzable group. Examples of such amines include: gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylethyldiethoxysilane and (CH$_3$O)$_3$Si—(CH$_2$)$_3$—NH—(CH$_2$)$_2$—NH—(CH$_2$)$_3$—Si(OCH$_3$)$_3$.

(b) Illustrative examples of the reactive silicon-containing constituent for a composition of the invention include reaction products of an amino-functional silicon-containing compound and an amine reactive (meth)acrylyl-containing compound. Examples of suitable amino-functional silicon-containing compounds include gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane and delta-aminobutylethyldiethoxysilane. Examples of suitable (meth)acrylyl-containing compounds reactive with amines include: hydrocarbonpolyol poly(meth)acrylates, saturated polyesterpolyol poly(meth)acrylates, alkydpolyol poly(meth)acrylates, urethanepolyol poly(meth)acrylates, polyurethanepolyol poly(meth)acrylates, polyamidepolyol poly(meth)acrylates, etherpolyol poly(meth)acrylates, polyetherpolyol poly(meth)acrylates, and mixtures thereof. Typically, the aforesaid amino-functional silicon-containing compound and (meth)acrylyl-containing compound reactive with amines are readily reacted simply by blending them at room temperature or at a slightly elevated temperature, for example, up to about 100 degrees Celsius. The reaction of an amine group with a (meth)acrylyl group is often referred to as a Michael addition. Additional illustrative description of reaction products of amino-functional silicon-containing compounds and amine reactive (meth)acrylyl-containing compounds (such as the poly(meth)acrylates described above) can be found, for example, in U.S. Pat. No. 4,429,082 which is hereby incorporated by reference. For convenience, the terms "(meth)acrylyl" and "poly(meth)acrylates" have been used herein to denote either or both of the respective acrylyl and methacrylyl groups and either or both of the respective polyacrylates and polymethacrylates.

(c) Illustrative examples of the reactive silicon-containing constituent for a composition of the invention include reaction products of an amino-functional silicon-containing compound and a compound containing at least one epoxy group. Examples of suitable amino-functional silicon-containing compounds can be found in part (a) above. Examples of suitable compounds containing at least one epoxy group include the generally known polyglycidyl ethers of polyphenols and the hydrogenated derivatives thereof such as, for example, the diglycidylether of bisphenol-A, the diglycidylether of hydrogenated bisphenol-A, EPON 828 and EPON 1001 (from Shell Chemical Company); butylene oxide; gamma-glycidoxypropyltrimethoxysilane and beta-(3,4-epoxycyclohexyl)ethyltrimethoxysilane; the polyglycidyl ethers of mononuclear polyhydric phenols such as the polyglycidyl ethers of resorcinol, pyrogallol, hydroquinone and pyrocatechol; as well as the polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane. Many additional examples of epoxy resins are described in the *Handbook of Epoxy Resins*, Henry Lee and Kris Neville, 1967, McGraw Hill Book Company.

(d) Illustrative examples of the reactive silicon-containing constituent for a composition of the invention include an organosilicon-containing material comprising a compound, corresponding to the formula R—Si-(OR$^6$)$_3$ wherein R independently represents OR$^6$, hydrogen, a C$_1$–C$_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, a—Si(OR$^6$)$_3$ group and/or a halo group, or a OR$^7$ group in which R$^7$ represents alkyl having at least 4 carbon atoms, aryl, alkylaryl, arylalkyl, aryloxyalkyl, or alkyloxyalkyl, and wherein R$^6$ independently represents a C$_1$–C$_3$ alkyl group. In the aforesaid definition of R, it is to be understood that the C$_1$–C$_{10}$ group joined to Si through an Si—C linkage can be saturated or can contain aromatic and/or ethylenic unsaturation.

Examples of suitable organosilicon-containing materials include but are not limited to the following (i) through (iv).

(i) Suitable organosilicon-containing materials include organosilicates, including partial hydrolysis products thereof, such as organosilicates corresponding to the following formula (II),

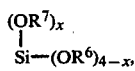
(II)

$$Si-(OR^6)_{4-x},$$
with $(OR^7)_x$ above Si $R^6$ represents methyl, ethyl or propyl (thus $OR^6$ is a "lower alkoxy" moiety), $R^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Examples of organosilicates, other than the above organosilicates, which may be utilized in the invention include tetraacetoxysilane, diethoxydiacetoxysilane, and

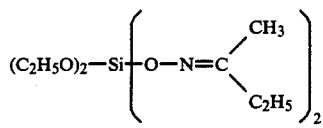

As stated previously the partial hydrolysis products of the organosilicates can be used as organosilicon-containing material. Hydrolyzed organosilicates provide increased reactive groups per molecule.

In preparing a partial hydrolysis product, for example, from an organosilicate of formula (II) above, a controlled amount of water typically is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (V) infra. The partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like.

(ii) Suitable organosilicon-containing materials include nonfunctional organosilanes, including partial hydrolysis products thereof. As used herein, a nonfunctional organosilane is understood to mean a material corresponding to the formula, (III),

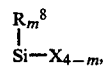
(III)

$$Si-X_{4-m},$$
with $R_m^8$ above Si wherein $R^8$ represents hydrogen, alkyl, vinyl, aryl, aryl, alkylaryl, arylalkyl, or aryloxyalkyl;

X represents $-OR^1$,

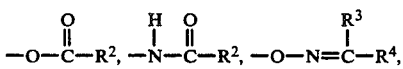

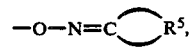

and the monohydroxy and/or cyclic $C_2$-$C_3$ residue of a 1,2- or 1,3-glycol, wherein $R^1$ represents $C_1$-$C_3$ alkyl, preferably $C_1$-$C_2$ alkyl, and most preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene, and m is an integer ranging from 1 to 2, preferably 1.

It should be understood that the term "nonfunctional organosilane" wherever appearing herein is used for convenience to distinguish compounds corresponding to the above formula, (III) (and/or partial hydrolysis products thereof) from those compounds (and/or partial hydrolysis products thereof) referred to herein for convenience as functional organosilanes and corresponding to the formula (IV) infra. Thus, although moieties defined by X in formula (III) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water typically is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (V) infra. The partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (III) in which X corresponds to $-OR^1$ as defined above is employed.

Examples of nonfunctional organosilanes corresponding to the above formula, (III), include methyl trimethoxy silane (e.g., available from Union Carbide, Corp. as A-163), dimethyldimethoxysilane, methyltriethoxysilane, dimethyldiethoxysilane, dimethoxydiphenylsilane, dimethoxymethylphenylsilane, diethoxydipropylsilane, dimethoxydipropylsilane, and the like. Additional examples of the nonfunctional organosilanes include amyltriethoxysilane and triethoxysilane. Compounds such as trimethylmethoxysilane, trimethylethoxysilane, and ethoxytripropylsilane may be employed where desired in limited, controlled amounts for modification purposes.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyltrimethoxysilane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, tolyloxydimethoxymethylsilane, phenylethyloxydimethoxymethylsilane, and the like. However, when a composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the composition should contain a residual amount of the easily hydrolyzable moieties (Y) from the organosilicon-containing material. Moreover, the presence of such $OR^7$ type groups in a composition of the invention, may contribute to a slower rate of cure.

(iii) Suitable organosilicon-containing materials include functional organosilanes, including partial hydrolysis products thereof. As used herein, a "functional organosilane" is intended to include materials corresponding to the following formula, (IV), $$F-G-SiX_3, \quad (IV)$$

wherein
G represents an organo group containing from 2 to 10 carbon atoms,
X represents $-OR^1$,

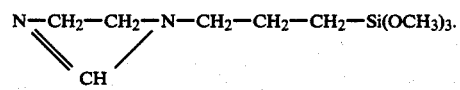

and the monohydroxy and/or cyclic $C_2-C_3$ residue of a 1,2- or 1,3-glycol, wherein
$R^1$ represents $C_1-C_3$ alkyl, preferably $C_1-C_2$ alkyl, and most preferably methyl,
$R^2$ independently represents H or $C_1-C_4$ alkyl, $R^3$ and $R^4$ independently represent H, $C_1-C_4$ alkyl, $C_6-C_8$ aryl and
$R^5$ represents $C_4-C_7$ alkylene, and
F represents amino, polyamino, 1,2-epoxy, mercapto, cyano, allyl, vinyl, urethano, halo, isocyanato, ureido, imidazolinyl, acrylato, methacrylato, or a group corresponding to $-SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane." Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, vinyl trimethoxy silane, vinyl triethoxy silane, mercaptopropyltrimethoxysilane, mercaptoethyltrimethoxysilane, mercaptopropyltriethoxysilane, glycidoxypropyltrimethoxysilane, glycidoxypropyltriethoxysilane, 4,5-epoxycyclohexylethyltrimethoxysilane, ureidopropyltrimethoxysilane, ureidopropyltriethoxysilane, chloropropyltrimethoxysilane, chloropropyltriethoxysilane, $(CH_3O)_3Si-(CH_2)_3-NH-(CH_2)_2-NH-(CH_2)_3-Si(OCH_3)_3$, and

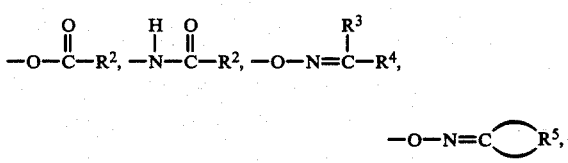

(iv) It is to be understood that mixtures and/or partially hydrolyzed mixtures of (i) the organosilicates (and/or partial hydrolysis products thereof), and/or (ii) the nonfunctional organosilanes (and/or partial hydrolysis products thereof), and/or (iii) the functional organosilanes (and/or partial hydrolysis products thereof) may be employed as the organosilicon-containing material.

In preparing a partial hydrolysis product, for example, from a nonfunctional organosilane of formula (III) above, a controlled amount of water is utilized. Generally, the partial hydrolysis product will contain condensation product compounds having one or more siloxane linkages represented by the formula (VI),

The hydrolysis and condensation reactions believed to be involved in the preparation of the partial hydrolysis products typically may be illustrated as follows:

[hydrolysis]

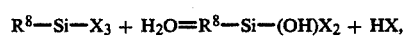

and

[condensation]

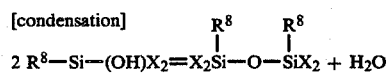

wherein $R^8$ and X are as defined in formula (III) above, X being an easily hydrolyzable group such as, for example, methoxy or ethoxy.

In one method for preparing a partial hydrolysis product for a composition of the invention, an organosilicon-containing material containing a nonfunctional organosilane corresponding to formula (III) above, such as methyl trimethoxy silane, optionally in combination with an organosilicate corresponding to formula (II) above and/or a functional organosilane corresponding to formula (IV) above is employed. The amount of water typically used for preparing a partially hydrolyzed organosilicon-containing material utilized for this method can be determined according to the following formula (V), $$(E_{1,2} \times 0.5) + (E_{3,4} \times Z) = W,$$

wherein
- W represents the total moles of $H_2O$ employed calculated on the total equivalents of the easily hydrolyzable groups from organosilane compounds such as organosilicates, nonfunctional organosilanes, and functional organosilanes,
- $E_{1,2}$ represents the total number of equivalents of easily hydrolyzable groups from organosilane compounds containing one or two easily hydrolyzable groups,
- $E_{3,4}$ represents the total number of equivalents of easily hydrolyzable groups from organosilane compounds containing three or four easily hydrolyzable groups, and
- Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (V) above, $E_{1,2}$ would equal 0.234 and $E_{3,4}$ would equal 4.05; and assuming the maximum moles of water for preparation of the partial hydrolysis product according to formula (V) (i.e., Z= 0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (V) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (V) above, also contain a small amount of silanol-type (—Si—OH) hydroxyl groups. However, such partial hydrolysis products generally will contain a ratio of residual easily hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst such as gamma-aminopropyl triethoxy silane, isophorone diamine, 2-amino-2-methyl-1-propanol, or the like. The percent by weight of catalyst is based on the total weight of the organosilicon-containing material. Preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" of the partial hydrolysis product typically is in a range of from 40 to 300, usually in a range of from 50 to 200.

(e) Illustrative examples of the reactive silicon-containing constituent for a composition of the invention include reaction products of: an amino-functional silicon-containing compound; a compound containing at least one epoxy group; and an organosilicon-containing material comprising a compound, corresponding to the formula $R-Si(OR^6)_3$ wherein R independently represents $OR^6$, hydrogen, a $C_1-C_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, a $-Si(OR^6)_3$ group and/or a halo group, or a $OR^7$ group in which $R^7$ represents alkyl having at least 4 carbon atoms, aryl, alkylaryl, arylalkyl, aryloxyalkyl, or alkyloxyalkyl, and wherein $R^6$ independently represents a $C_1-C_3$ alkyl group. In the aforesaid definition of R, it is to be understood that the $C_1-C_{10}$ group joined to Si through an Si-C linkage can be saturated or can contain aromatic and/or ethylenic unsaturation. Examples of suitable amino-functional silicon-containing compounds can be found in part (a) above. Examples of suitable compounds containing at least one epoxy group can be found in part (c) above. Examples of suitable organosilicon-containing materials can be found in subparts (i) through (iv) of part (d) above.

Compositions of the invention may be stored in airtight containers so as to prevent the introduction of moisture into the composition. Where desired, they may be stored under dry nitrogen. Also, product compatible materials which easily hydrolyze so as to act as scavengers for water may be incorporated in the compositions. Examples of such easily hydrolyzable product compatible materials include organosilicates, organosilanes, or materials such as ethylorthoformate and 2,2-dimethoxy propane. Additionally, low molecular weight alcohols such as methanol and ethanol can be utilized to enhance the stability of the compositions.

Compositions of the invention advantageously may be utilized, for coating various substrates such as metal, paper, wood, wood furniture, hardboard, plastics, glass, foams, cloth, as well as over primers. The compositions also may be utilized in adhesives, sealants, inks, etc.

It has been found that cured films having an excellent combination of physical and appearance properties can be prepared from the compositions when cured at ambient temperature (room temperature) or when heat cured. Compositions of the invention can provide automotive quality coatings for both original equipment manufacture and automotive refinishing applications which can be cured at low temperatures (less than 180 degrees F., 82.2 degrees C.). Preferred compositions for automotive refinishing applications can be cured at ambient temperature (e.g., 25 degrees C.) in the presence of atmospheric moisture and usually in the presence of a catalyst.

Examples of catalysts which may be used to promote the cure of compositions of the invention include: an organic acid, such as p-toluenesulfonic acid, and n-butylphosphoric acid; a metallic salt of an organic acid, such as tin naphthenate, tin benzoate, tin octoate, tin butyrate, dibutyltin dilaurate, dibutyltin diacetate, iron stearate, and lead octoate; titanates such as tetraisopropyl titanate and tetrabutyl titanate; oxides such as dibutyltin oxide; an organic base, such as isophorone diamine, methylene dianiline, imidazole, gamma-aminopropyl triethoxy silane, aminoalcohols such as 2-amino-2-methyl-1-propanol and other basic nitrogen-containing compounds; a compound containing a fluoride ion such as tetrabutyl ammonium fluoride, benzyl trimethyl ammonium fluoride, sodium fluoride, potassium fluoride and cesium fluoride; or a mixture thereof.

The specific amounts of cure-promoting catalyst which can be utilized in the compositions vary considerably depending upon factors such as the rate of cure desired, the specific composition of the first and second silicon-containing resins, the amount of moisture present in the ambient atmosphere and the like. However, in general, the coating compositions of the invention may contain from about 0.01 parts to about 5 parts by weight of cure-promoting catalyst based on 100 parts by weight of resin solids.

Compositions of the invention can contain organic solvents, examples of which include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butyl-acetate; hydrocarbons such as xylene and toluene; N-methyl-2-pyrrolidone; dimethyl formamide; and mixtures thereof. Compositions of the invention also can contain water although this is not preferred.

In addition to the foregoing components, the compositions of the invention may contain optional ingredients, including various pigments of the type ordinarily utilized in coatings of this general class. In addition, various fillers; plasticizers; antioxidants; mildewcides and fungicides; surfactants; various flow control agents including, for example, thixotropes and additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference; and other such formulating additives may be employed in some instances.

Pigments suitable for a composition of the invention include a wide variety of pigments such as metallic flake pigments and various white and colored pigments.

Examples of metallic-flake pigments include generally known metallic flakes such as aluminum flakes, nickel flakes, tin flakes, silver flakes, chromium flakes, stainless steel flakes, gold flakes, copper flakes and combinations thereof. Examples of white and colored pigments include generally known pigments based on metal oxides; metal hydroxides; metal sulfides; metal sulfates; metal carbonates; carbon black; china clay; phthalo blues and green, organo reds, and other organic dyes.

Compositions of the invention can be applied to a substrate by any conventional method such as brushing, dipping, flow coating, roll coating, curtain coating, and spraying. Typically they are most often applied by spraying. One advantage they provide is their ability to be spray applied at a high solids concentration, i.e., 40 percent total solids, preferably 50 percent total solids and greater when the viscosity of the composition is 25 seconds or less on a No. 4 Ford Cup. Conventional spray techniques and equipment can be utilized.

As indicated, the coating compositions of this invention can be cured by heating or typically by exposure to atmospheric moisture at ambient temperature. It is desirable in some instances to prepare the compositions in the form of a two package system, i.e., for example, one package containing the first and second silicon-containing resins along with any desired optional ingredients and a second package containing a cure-promoting catalyst component. The compositions in the absence of the cure-promoting catalyst exhibit good pot life. When it is desired to coat a substrate with the composition, the components of the two packages are merely mixed together just prior to application and the resulting composition applied to the substrate by one of the methods such as those described above.

The compositions of this invention have utility in general coating applications and can also be useful in specialty applications such as automotive paints including paints for automobile refinishing. The compositions of the present invention have been found to be especially useful in a so-called "color plus clear" method of coating which method is described in U.S. Pat. Nos. 4,499,151 and 4,501,872.

A coating composition of the invention can be utilized either as a sole film-former or optionally in combination with an additional film-forming thermoplastic and/or thermosetting resin. Examples of such additional film-forming thermoplastic and/or thermosetting resins include the generally known cellulosics, acrylics, aminoplasts, urethanes, polyesters, polyethers, polyamides, epoxies or mixtures thereof.

Coating compositions of the invention can provide cured films having an excellent combination of properties such as the hardness required for automotive coatings both for original equipment automotive applications and automotive refinishing applications, good solvent resistance, high initial gloss, good gloss retention, as well as good distinctness of image. Appearance properties such as, for example, high gloss and distinctness of image are particularly critical for films required in high performance coatings applications as exist, for example, in both the automotive original equipment and automotive refinish industries. Moreover, preferred compositions of the invention can provide cured films having a good combination of both hardness and flexibility.

As stated previously, in a preferred embodiment of the invention the first silicon-containing resin has a glass transition temperature of greater than 25 degrees C., preferably from about 30 degrees C. to about 120 degrees C., and the second silicon-containing resin serves as a flexibilizer for the first silicon-containing resin. Thus, when the second silicon-containing resin is utilized in a composition of the invention as a flexibilizer for the first silicon-containing resin, the composition of the invention containing such second silicon-containing resin, can be cured to a film having improved flexibility over the composition without the second silicon-containing resin as flexibilizer. When the second silicon-containing resin is utilized as a flexibilizer for the first silicon-containing resin, the amount of second silicon-containing resin is in a range of from about 5 to about 40 percent by weight, preferably from about 5 to about 20 percent by weight, based on total resin solids in the composition. In this preferred embodiment, the second silicon-containing resin typically has a silicon content of from 5 to 35 percent by weight based on the weight of said second silicon-containing resin, and a number average molecular weight of from 500 to 5,000 determined by gel permeation chromatography using a polystyrene standard.

The examples which follow are submitted for the purpose of further illustrating the nature of the invention and should not be construed as a limitation on the scope thereof.

As used in the body of the specification, examples, and claims, all percents, ratios and parts are by weight unless otherwise specifically indicated. As used herein, "pbw" stands for "parts by weight".

EXAMPLE 1

This example illustrates the preparation of a resin utilized in a composition of the invention in Example 4.

(a) A reaction vessel equipped with stirrer, addition funnels, Dean Stark trap, means for maintaining a nitrogen blanket and thermometer is charged with 4080.0 g of 2,2-dimethyl-3-hydroxypropyl-2,2-dimethyl-3-hydroxypropionate (ESTER DIOL 204 from Union Carbide Corp.), 4028.0 g of mercaptopropionic acid, 24.3 g of paratoluene sulfonic acid and 1435.1 g of toluene and the contents of the vessel are heated under nitrogen to reflux (about 108 degrees C.) and held at reflux for seven hours while the temperature of the contents of the vessel ranges between 105 degrees C. and 129 degrees C. The distillate containing water is removed via the Dean Stark trap. A total of 725 g of distillate is removed.

The product is a mercapto functional ester having an acid value of 0.2, a mercapto equivalent weight of 255, a Gardner color value of 1, a Gardner-Holdt bubble tube viscosity of less than A, and a solids content measured at 110 degrees C. for 1 hour of 76.4 percent by weight.

(b) A reaction vessel equipped with stirrer, addition funnels, means for maintaining a nitrogen blanket and thermometer is charged with 250.0 g of toluene and the contents are heated to reflux (about 110 degrees C.).

Next the addition of three charges are begun simultaneously to the contents of the vessel. Charge I consists of 4827.2 g of the resultant product of part (a) above. Charge II consists of 3406.3 g of vinyl trimethoxy silane. Charge III consists of 75.1 g of 2,2'-azobis(2,4-dimethylvaleronitrile) (available as VAZO 67) dissolved in 400 g of toluene. Charges I and II and about ¾ of charge III are added to the contents of the vessel over a period of 1 ½ hours while the temperature is maintained at about 107 degrees C. When the additions of charges I and II are complete 50.0 g of toluene is added to the contents of the vessel through the addition funnel used for charge I and 20.0 g of toluene is added through the addition funnel used for charge II. The remainder of charge III is added over an additional ½ hour while the temperature is maintained at about 107 degrees C. When the addition of charge III is complete, 10.0 g of toluene is added to the contents of the vessel through the addition funnel used for charge III. Thereafter, the contents of the vessel are held for 2 hours at reflux and thereafter cooled to 60 degrees C. and distilled under reduced pressure such that 917 g of volatile material is removed. Thereafter the contents of the vessel are allowed to cool to ambient temperature and filtered through HI-FLOW filter material.

The resultant product has an acid value of 0.05, a mercapto equivalent weight of 18,868, a Gardner-Holdt viscosity of less than A, a Gardner color value of 3, and has a total solids content measured at 110 degrees C. for 1 hour of 81.3 percent by weight.

EXAMPLE 2

This example illustrates the preparation of a resin utilized in a composition of the invention in Example 4.

(a) A reaction vessel equipped with stirrer, addition funnels, Dean Stark trap, means for maintaining a nitrogen blanket and thermometer is charged with 2397.5 g of a polyester polyol described in footnote 1 below, 504.0 g of mercaptopropionic acid, 8.7 g of para-toluenesulfonic acid and 250.0 g of toluene, and the contents of the vessel are heated under nitrogen to reflux (about 118 degrees C.) and held at reflux for 40 minutes while the temperature of the contents of the vessel ranges between 118 degrees C. and 138 degrees C. and 55 g of water is removed via the Dean Stark trap. Next, 100 g of toluene is added to the contents of the vessel and the contents are heated over 20 minutes to reflux and held at reflux for 25 minutes at the end of which another 100 g of toluene is added when the pot temperature is 139 degrees C. Heating and reflux are continued for ½ hour at the end of which period another 100 g of toluene is added when the pot temperature is 137 degrees C. Thereafter, heating and refluxing (at a pot temperature of 138 degrees C.) is continued over 4 hours and 15 minutes at the end of which period a total of 85.5 g of distillate containing water (i.e., including the 55 g referred to above) has been removed via the Dean Stark trap. Thereafter, the contents of the vessel are vacuum stripped to a total solids content of 97.5 percent by weight after which the total solids content is readjusted by the addition of toluene back to 84.3 percent by weight. The product is a mercapto functional polyester.

[1] A polyester polyol prepared using 154.2 pbw 1,6-hexanediol, 309.4 pbw hexahydrophthalic anhydride, 135.8 pbw neopentyl glycol, 135.0 pbw butyl stannoic acid and 135.0 pbw triphenyl phosphite and having an acid value of 9.6, a hydroxyl number of 120.6 and a Gardner Holdt bubble tube viscosity of S—.

(b) A reaction vessel equipped with stirrer, addition funnels, means for maintaining a nitrogen blanket and thermometer is charged with 250.5 g of toluene and the contents are heated to reflux (about 110 degrees C.). Next the addition of three charges are begun simultaneously to the contents of the vessel. Charge I consists of 1899.5 g of the resultant product of part (a) above. Charge II consists of 444.3 g of vinyl trimethoxy silane. Charge III consists of 20.5 g of 2,2'-azobis(2,4-dimethylvaleronitrile) (available as VAZO 67) dissolved in 100 g of toluene. Charges I and II and about ¾ of charge III are added to the contents of the vessel over a period of 1 ½ hours while the temperature is maintained at about 110 degrees C. When the additions of charges I and II are complete, 30.0 g of toluene is added to the contents of the vessel through the addition funnel used for charge I and 5.0 g of toluene is added through the addition funnel used for charge II. The remainder of charge III is added over an additional ½ hour while the temperature is maintained at about 110 degrees C. When the addition of charge III is complete, 5.0 g of toluene is added to the contents of the vessel through the addition funnel used for charge III. Thereafter, the contents of the vessel are heated over 15 minutes to reflux and held for 2 hours at reflux and thereafter distilled under reduced pressure such that 290 g of volatile material is removed. Thereafter the contents of the vessel are allowed to cool to ambient temperature and filtered.

The resultant product has a mercapto equivalent weight of infinity, a viscosity of 3.2, a Gardner color value of between 1 and 2, a total solids content measured at 110 degrees C. for 1 hour of 76.9 percent by weight, and has a molecular weight of 2930 and a peak molecular weight of 2515 with a polydispersity of 2.31 as determined by gel permeation chromatography using a polystyrene standard.

EXAMPLE 3

This example illustrates the preparation of an acrylic silane addition interpolymer utilized in Compositions 1, 2 and 3 of Example 4.

|  | Percent by Weight |
|---|---|
| Methyl methacrylate | 50.0 |
| Butyl acrylate | 30.0 |
| Gamma-methacryloxy-propyl trimethoxysilane | 20.0 |

A reaction vessel equipped with condenser, stirrer, thermometer, dropping funnel and means for maintaining a nitrogen blanket is charged with 336.0 g of butyl acetate, 144.0 g of VM & P naphtha, and 96.0 g of toluene. The contents of the vessel are then heated to reflux, about 119 degrees C., while under a nitrogen blanket and agitation. Three charges are next made simultaneously over a period of two hours while maintaining the vessel at reflux conditions. Charge I consists of a mixture of 1120.0 g of methyl methacrylate, 672.0 g of butyl acrylate and 448.0 g of gamma-methacryloxypropyltrimethoxysilane. Charge II consists of 192.0 g of butyl acetate and 56.0 g of 2,2'-azobis-(2-methylisobutyronitrile) initiator. Charge III consists of 144.0 g of butyl acetate and 112.0 g of 3-mercaptopropyltrimethoxysilane chain transfer agent. The three charges are completed after two hours at which time a mixture of 24.0 g of butyl acetate and 8.96 g of 2,2'-azobis-(2-methylisobutyronitrile) is added. The contents of the vessel are maintained at reflux for another hour after which still another mixture of 24.0 g of butyl acetate and 8.96 g of 2,2'-azobis-(2-methylisobutyronitrile) is added. Thereafter, the contents of the vessel are allowed to reflux for 1.5 hours after which heating is discontinued and the contents of the vessel allowed to cool to room temperature.

The resultant product mixture containing acrylic silane addition interpolymer has a solids content measured for 2 hours at 150 degrees C. of 69.8 percent by weight, a viscosity of 10.0 Stokes and an acid value of 0.1. An analysis of the resultant product shows it to have a number average molecular weight of 2,196, a weight average molecular weight of 5,552 and a peak molecular weight of 4,884 as determined by gel permeation chromatography using a polystyrene standard.

EXAMPLE 4

This example illustrates the preparation and curing of two compositions of the invention and of a comparative composition.

(a) Compositions 1 and 2 of Table 1 are compositions of the invention and Composition 3 of Table 1 is a comparative composition.

TABLE 1

|  | Composition No. | | |
|---|---|---|---|
|  | 1 | 2 | 3 |
|  | Amount in grams | | |
| Methyl ethyl ketone | 37.7 | 46.5 | 52.2 |
| Dibutyl tin dilaurate | 3.0 | 3.0 | 3.0 |
| Resultant product of Example 1(b) | 22.7 | 0 | 0 |
| Resultant product of Example 2(b) | 0 | 23.8 | 0 |
| Resultant product of Example 3 | 114.3 | 114.3 | 142.9 |
| Total Weight | 177.7 | 187.6 | 198.1 |
| No. 4 Ford Cup Viscosity in seconds | 17 | 17.2 | 17 |
| Percent Theoretical Total Solids | 58% | 54.9% | 52% |

(b) Two samples of each of Compositions 1 through 3 are applied to two steel panels to a wet film thickness of 3 mils. One of the resulting clear films from each of the Compositions is cured for 30 minutes at 285 degrees F. (141 degrees C.) and the other of the resulting clear films from each of the Compositions is cured at ambient temperature in air for 3 days.

Each of the cured films is tested for Sward Hardness, and solvent resistance, and the films cured at ambient temperature are also tested for flexibility. Solvent resistance is tested by rubbing each of the films using 20 back-and-forth finger rubs with a cloth dipped in xylene and observing for deterioration of the film as evidenced by marring due to softening when rubbed. Flexibility is tested by bending the panel with the film around a 1 inch (2.54 cm) mandrel and observing for deterioration of the film as evidenced by cracking and/or delamination. The results are as set forth in the following Table 2.

TABLE 2

| Composition No. | 1 | 2 | 3 |
|---|---|---|---|
| Sward Hardness | | | |
| 30 min/285° F. | 44 | 36 | 54 |
| Ambient Cure | 22 | 20 | 30 |
| Solvent Resistance | | | |
| 30 min/285° F. | good | good | good |
| Ambient Cure | good | good | poor |

TABLE 2-continued

| Composition No. | 1 | 2 | 3 |
|---|---|---|---|
| Flexibility | | | |
| Ambient Cure | good | good | poor |

As can be seen from the results set forth in Table 2 above, the films prepared from Compositions 1 and 2, containing product resins of Examples 1(b) and 2(b) in combination with the acrylic silane addition interpolymer, and cured at ambient temperature exhibit better solvent resistance and flexibility than the film prepared from comparison Composition 3, containing the acrylic silane addition interpolymer without the aforesaid product resins.

What is claimed is:

1. A curable composition comprising:
   (A) a first silicon-containing resin containing at least one molecule having in a terminal and/or side chain thereof at least one silicon atom bonded to a group Y, wherein Y represents a hydrolyzable group; and
   (B) a second silicon-containing resin, different from said first silicon-containing resin, said second silicon-containing resin containing at least one molecule having in a terminal and/or side chain thereof at least one group corresponding to the formula

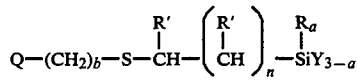

wherein
   Q is the residue of a substance selected from the group consisting of a polyester resin, an acrylic resin, a urethane resin, a polyamide resin, and a polyether resin,
   each Y, which may be the same or different, represents a hydrolyzable group,
   each R, which may be the same or different, represents a $C_1$-$C_4$ alkyl group, a vinyl group or an allyl group,
   each R', which may be the same or different, represents H or a $C_1$-$C_4$ alkyl group,
   a represents an integer of from 0 to 2,
   b represents an integer of from 0 to 6, and
   n represents an integer of from 1 to 2.

2. The curable composition of claim 1 wherein said first resin is a vinyl polymer.

3. The curable composition of claim 2 wherein said vinyl polymer is an addition interpolymer containing alkoxy silane groups and/or acyloxy silane groups, said addition interpolymer derived from the reaction of a mixture of monomers wherein the mixture of monomers comprises
   (i) from about 50 percent to about 95 percent of at least one ethylenically unsaturated silicon-free monomer, and
   (ii) from about 5 percent to about 50 percent of a copolymerizable ethylenically unsaturated silane monomer selected from the group consisting of an alkoxy silane monomer, an acyloxy silane monomer, and a mixture thereof.

4. The curable composition of claim 1 wherein each Y, which may be the same or different, is selected from the group consisting of $-OR^1$,

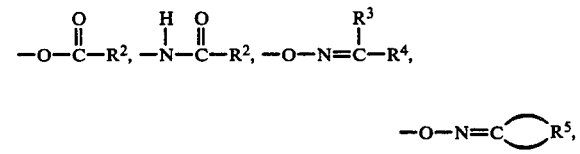

and the monohydroxy and/or cyclic $C_2$-$C_3$ residue of a 1,2- or 1,3-glycol, wherein
   $R^1$ represents $C_1$-$C_4$ alkyl, or
   $R^2$ independently represents H or $C_1$-$C_4$ alkyl,
   $R^3$ and $R^4$ independently represent H, $C_1$-$C_4$ alkyl, $C_6$-$C_8$ aryl and
   $R^5$ represents $C_4$-$C_7$ alkylene.

5. The curable composition of claim 1 wherein a equals 0 or 1 and R is a $C_1$-$C_4$ alkyl group.

6. The curable composition of claim 5 wherein a is 0 and n is 1.

7. The curable composition of claim 1 wherein each hydrolyzable group Y, which may be the same or different, of said second silicon-containing resin represents a $C_1$-$C_4$ alkoxy group.

8. The curable composition of claim 1 wherein said first silicon-containing resin has a glass transition temperature of greater than 25 degrees C.

9. The curable composition of claim 1 wherein said second silicon-containing resin is a reaction product of (A) the adduct of a mercapto-functional alcohol and a vinyl trialkoxy silane, (B) an organic polyisocyanate, and (C) a polyhydroxyl-functional ester.

10. The curable composition of claim 9 wherein said reaction product is prepared by first reacting said adduct with said organic polyisocyanate to form a resulting product and thereafter reacting said resulting product with said polyhydroxyl-functional ester.

11. The curable composition of claim 1 wherein said second silicon-containing resin is prepared by the reaction of (A) a mercapto-functional resin and (B) a vinyl trialkoxy silane, in the presence of a free radical initiator.

12. The curable composition of claim 11 wherein said vinyl trialkoxy silane is selected from the group consisting of vinyl trimethoxy silane, vinyl triethoxy silane and a mixture thereof.

13. The curable composition of claim 11 wherein said mercapto-functional resin is a mercapto-functional polyester.

14. The curable composition of claim 13 wherein said mercapto-functional polyester is a reaction product of a polyhydroxyl-functional ester and a mercapto-functional carboxylic acid.

15. An improved curable composition comprising:
   (A) a first silicon-containing resin containing at least one molecule having in a terminal and/or side chain thereof at least one silicon atom bonded to a group Y, wherein Y represents a hydrolyzable group, said first silicon-containing resin having a glass transition temperature of greater than 25 degrees C.; and
   (B) a second silicon-containing resin, different from said first silicon-containing resin, and which serves as a flexibilizer for said composition, said second silicon-containing resin containing at least one molecule having in a terminal and/or side chain thereof at least one group corresponding to the formula

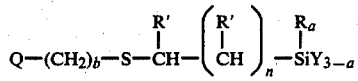

wherein

Q is the residue of a substance selected from the group consisting of a polyester resin, an acrylic resin, a urethane resin, a polyamide resin, and a polyether resin, each Y, which may be the same or different, represents a hydrolyzable group, each R, which may be the same or different, represents a $C_1$–$C_4$ alkyl group, a vinyl group or an allyl group, each R', which may be the same or different, represents H or a $C_1$–$C_4$ alkyl group, a represents an integer of from 0 to 2, b represents an integer of from 0 to 6, and n represents an integer of from 1 to 2.

16. The improved curable composition of claim 15 wherein said second silicon-containing resin has a silicon content of from 5 to 35 percent by weight based on the weight of said second silicon-containing resin.

17. The improved curable composition of claim 16 wherein said second silicon-containing resin has a number average molecular weight of from 500 to 5,000.

18. The improved curable composition of claim 17 wherein said second silicon-containing resin is a reaction product of (A) the adduct of a mercapto-functional alcohol and a vinyl trialkoxy silane, (B) an organic polyisocyanate, and (C) a polyhydroxyl-functional ester.

19. The improved curable composition of claim 18 having a total solids content of at least 40 percent by weight at a No. 4 Ford cup viscosity of less than 25 seconds.

20. The curable composition of claim 1 additionally comprising an organic polyol.

21. The curable composition of claim 1 additionally comprising an organosilicon-containing material comprising a compound, corresponding to the formula R—Si(OR$^6$)$_3$ wherein R independently represents OR$^6$, hydrogen, a $C_1$–$C_{10}$ group joined to Si through an Si-C linkage, or a OR$^7$ group in which R$^7$ represents alkyl having at least 4 carbon atoms, aryl, alkylaryl, arylalkyl, aryloxyalkyl, or alkyloxyalkyl, and R$^6$ independently represents a $C_1$–$C_3$ alkyl group.

22. The curable composition of claim 1 additionally comprising an organosilicon-containing material comprising a partial hydrolysis product of a compound corresponding to the formula R—Si(OR$^6$)$_3$ wherein R independently represents OR$^6$, hydrogen, a $C_1$–$C_{10}$ group joined to Si through an Si-C linkage, or a OR$^7$ group in which R$^7$ represents alkyl having at least 4 carbon atoms, aryl, alkylaryl, arylalkyl, aryloxyalkyl, or alkyloxyalkyl, and R$^6$ independently represents a $C_1$–$C_3$ alkyl group.

23. The curable composition of claim 1 additionally comprising an amine having in a molecule thereof at least one silicon atom directly bonded to a group Y wherein Y represents a hydrolyzable group.

24. The curable composition of claim 23 wherein said amine comprises a reaction product of an amino-functional silicon-containing compound and a compound containing at least one epoxy group.

25. The curable composition of claim 23 wherein said amine comprises a reaction product of (a) an amino-functional silicon-containing compound, (b) a compound containing at least one epoxy group, and (c) an organosilicon-containing material comprising a compound, corresponding to the formula R—Si(OR$^6$)$_3$ wherein R independently represents OR$^6$, hydrogen, a $C_1$–$C_{10}$ group joined to Si through an Si-C linkage, or a OR$^7$ group in which R$^7$ represents alkyl having at least 4 carbon atoms, aryl, alkylaryl, arylalkyl, aryloxyalkyl, or alkyloxyalkyl, and R$^6$ independently represents a $C_1$–$C_3$ alkyl group.

26. The curable composition of claim 23 wherein said amine comprises a reaction product of (a) an amino-functional silicon-containing compound, (b) a compound containing at least one epoxy group, and (c) an organosilicon-containing material comprising a partial hydrolysis product of a compound corresponding to the formula R—Si(OR$^6$) wherein R independently represents OR$^6$, hydrogen, a $C_1$–$C_{10}$ group joined to Si through an Si-C linkage, or a OR$^7$ group in which R$^7$ represents alkyl having at least 4 carbon atoms, aryl, alkylaryl, arylalkyl, aryloxyalkyl, or alkyloxyalkyl, and R$^6$ independently represents a $C_1$–$C_3$ alkyl group.

27. The curable composition of claim 23 wherein said amine comprises a reaction product of an amino-functional silicon-containing compound and an amine reactive acrylyl-containing compound.

* * * * *

UNITED STATES PATENT AND TRADEMARK OFFICE
CERTIFICATE OF CORRECTION

PATENT NO. : 4,652,610

DATED : March 24, 1987

INVENTOR(S) : Rostyslaw Dowbenko et al

It is certified that error appears in the above-identified patent and that said Letters Patent is hereby corrected as shown below:

Column 28, line 12, claim 4, delete "or"; line 14, insert --or-- after "alkyl,";

Column 30, line 40, claim 26, "R-Si(OR$^6$)" should read --R-Si(OR$^6$)$_3$--.

Signed and Sealed this

Twentieth Day of October, 1987

Attest:

DONALD J. QUIGG

Attesting Officer

Commissioner of Patents and Trademarks